J. A. MARINER.
COLLAR HOLDER.
APPLICATION FILED JAN. 6, 1919.
1,352,139.   Patented Sept. 7, 1920.
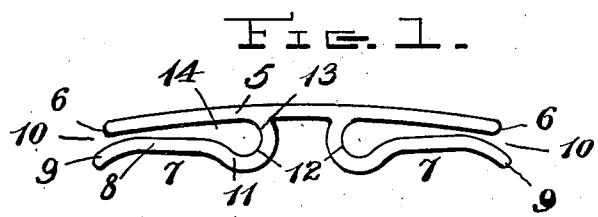
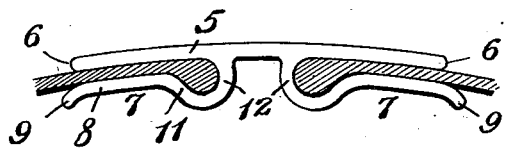
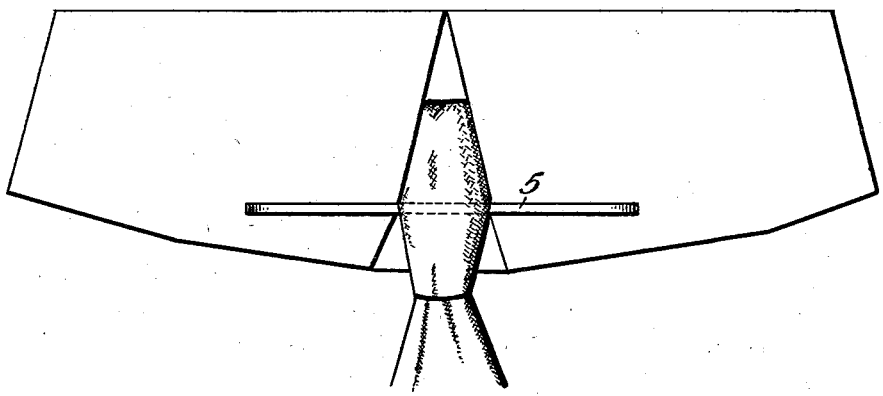
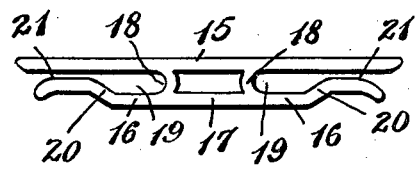
Joseph A. Mariner Inventor
By Victor J. Evans
Attorney

UNITED STATES PATENT OFFICE.

JOSEPH A. MARINER, OF CHICAGO, ILLINOIS.

COLLAR-HOLDER.

1,352,139.   Specification of Letters Patent.   Patented Sept. 7, 1920.

Application filed January 6, 1919. Serial No. 269,941.

*To all whom it may concern:*

Be it known that I, JOSEPH A. MARINER, a citizen of the United States, residing at Chicago, in the county of Cook and State of Illinois, have invented new and useful Improvements in Collar-Holders, of which the following is a specification.

This invention relates to collar holders and more particularly to an improvement structurally and functionally in the form of device shown in my Patent No. 1,214,205, of Jan. 30, 1917.

The object of the invention is the provision of a holder which can be manufactured with a greater economy of labor and material than was found necessary in the construction of the device of my patent aforesaid, and which is functionally superior to said prior device.

In the drawing:—

Figure 1 is a top plan view of the device.

Fig. 2 is a similar view conventionally illustrating the position of the parts when accommodating the collar ends.

Fig. 3 is a front view of a collar showing the application of the invention thereto.

Fig. 4 is a view similar to Fig. 1 showing a slightly modified form of the invention.

In the form of the invention shown in Figs. 1 to 3 inclusive, use is made of a bar 5, which is preferably of uniform thickness throughout and preferably cut or stamped out of sheet metal, the extreme ends of which being provided with curved surfaces 6 to promote application to the collar. At the back of the bar are co-acting clamping elements 7—7 each embodying a substantially resilient clamping member 8 normally spaced from the bar 5 and arranged at an angle to said bar 5. Each element 7 is provided with a free terminal 9 which is preferably flared from and extends longitudinally beyond the adjacent terminal of said bar 5 so as to form therewith an entrance throat 10 for the easy application of the device to the collar.

Each of the members 8 is curved inwardly at 11 at substantially an obtuse angle to the bar 5, then outwardly at 12 and forwardly at 13 at which latter point, it is integrally connected with the bar 5 approximately at the center thereof. In my aforesaid prior patent the device was formed of a single piece of material bent upon itself at its ends and then re-bent upon itself to provide the clamps. Much material and many bending operations were required in the manufacture of that device. This made it expensive and it was not entirely satisfactory for the purpose intended because it was too flexible and liable to break at the bends. I find that by integrally connecting the inner ends of the clamping members 7 to the bar 5, and cutting or stamping the device out of sheet metal it can be made more economically and a greater measure of rigidity is obtained, while at the same time sufficient resiliency is had to permit easy application of the clamping portions to the collar ends. The angular disposition of the clamps 8 with respect to the bar 5 permits ample clamping impingement of the said members upon the collar notwithstanding their spacing which permits free entrance of the seams of the collar ends into the loops 14. When the device is fully applied, the members 8 assume more or less the condition shown in Fig. 2. In use the seam receiving loops tend to assume their normal form while the seams of the collars are firmly secured in position.

In the form of the device shown in Fig. 4, the bar 15 is provided with integrally connected members 16—16. These members are tied together by an intermediate strip 17, while short portions 18 are utilized as the connecting means between the members 16—16 and said bar 15. The loops 19 are defined by the inner ends of the members 16 and adjacent portions of the bar 15. The members 16 have angularly disposed branches 20 which extend toward the bar 15, while outwardly of said branches 20, the members are provided with impinging surfaces 21 spaced from the bar 15. The surfaces or edges 21 co-act with the inner surfaces or edges of the bar 15 so as to constitute an effective clamp for the collar ends.

The forms of the parts can be changed without departing from the gist of the invention as claimed.

What is claimed as new is:—

1. A collar holder comprising a bar consisting of a single unfolded strip, and clamping members coacting therewith connected directly with the bar at points between the ends thereof, and extending outwardly in clamping relation with the end portions of said bar.

2. A collar holder comprising a bar, and clamping members coacting therewith and connected with the bar at points between the ends thereof, said clamping members extending respectively longitudinally beyond the ends of the bar.

3. A collar holder comprising a bar forming a pair of integral main clamping arms, and a pair of auxiliary clamping arms, each provided at its inner end with a loop integrally joining said main bar at a point intermediate its length, said main and auxiliary clamping arms being normally slightly inclined from each other, whereby the insertion of the collar flaps between said clamping arms causes them to assume parallel relation.

In testimony whereof I have affixed my signature.

JOSEPH A. MARINER.